United States Patent
Holstein et al.

(10) Patent No.: US 9,062,717 B2
(45) Date of Patent: Jun. 23, 2015

(54) PLAIN BEARING HAVING A HARD/SOFT PAIRING

(75) Inventors: Benjamin Holstein, Heidenheim (DE); Norman Perner, Berlin (DE); Klaus Spiegel, Dusseldorf (DE)

(73) Assignee: Voith Patent GmbH, Heidenheim (DE)

( * ) Notice: Subject to any disclaimer, the term of this patent is extended or adjusted under 35 U.S.C. 154(b) by 442 days.

(21) Appl. No.: 13/521,616

(22) PCT Filed: Jan. 22, 2010

(86) PCT No.: PCT/EP2010/000381
§ 371 (c)(1),
(2), (4) Date: Oct. 25, 2012

(87) PCT Pub. No.: WO2011/088847
PCT Pub. Date: Jul. 28, 2011

(65) Prior Publication Data
US 2013/0043623 A1  Feb. 21, 2013

(51) Int. Cl.
*F16C 17/14* (2006.01)
*F16C 23/02* (2006.01)
(Continued)

(52) U.S. Cl.
CPC .............. *F16C 43/02* (2013.01); *B23P 15/003* (2013.01); *F16C 23/02* (2013.01); *F16C 25/02* (2013.01);
(Continued)

(58) Field of Classification Search
CPC  B29C 35/0272; B29C 65/4815; B29C 65/76; B29D 33/00; B29L 2031/04; B29L 2031/045; F16C 9/03; F16C 9/06; F16C 17/14; F16C 23/00; F16C 23/02; F16C 23/06; F16C 25/00; F16C 25/02; F16C 25/06; F16C 43/02; F16C 2300/14; F16C 33/208; F16D 1/068; B23P 15/003; F02C 7/06; F01D 25/16; F01D 25/166; F01D 25/168

See application file for complete search history.

(56) References Cited

U.S. PATENT DOCUMENTS 3,388,552 A * 6/1968 Bilton .............................. 60/359
3,689,968 A * 9/1972 Truxillo ..................... 29/898.09
(Continued)

FOREIGN PATENT DOCUMENTS

| AT | 272012 | 6/1969 |
|---|---|---|
| DE | 663 790 | 8/1938 |

(Continued)

OTHER PUBLICATIONS

Japanese Office Action for Japanese Patent Application No. 2012-549252.

*Primary Examiner* — Alexander P Taousakis
*Assistant Examiner* — Matthew P Travers
(74) *Attorney, Agent, or Firm* — Farjami & Farjami LLP

(57) ABSTRACT

A method for producing a plain bearing including at least one plain bearing segment for forming a first plain bearing shell, at least one running element of a second plain bearing shell which forms a counter-bearing surface to the at least one plain bearing segment, with a sliding surface of the at least one running element having a higher hardness than a sliding surface of the at least one plain bearing segment, a carrying body for the at least one running element, an intermediate layer which is arranged between the at least one running element and the carrying body, a plastic deformability of which can be set by a temperature guidance. The method includes heating the intermediate layer, adjusting the running element, and reducing the plastic deformability of the intermediate layer by the temperature guidance.

20 Claims, 4 Drawing Sheets

(51) Int. Cl.
  F16C 25/02 (2006.01)
  F16C 43/02 (2006.01)
  B23P 15/00 (2006.01)
  F16D 1/068 (2006.01)
  B29C 35/02 (2006.01)
  B29C 65/48 (2006.01)
  B29D 33/00 (2010.01)
  B29L 31/04 (2006.01)
  F01D 25/16 (2006.01)
  F02C 7/06 (2006.01)
  F16C 33/20 (2006.01)

(52) U.S. Cl.
  CPC ......... *B29C 35/0272* (2013.01); *B29C 65/4815* (2013.01); *B29D 33/00* (2013.01); *B29L 2031/04* (2013.01); *F01D 25/16* (2013.01); *F02C 7/06* (2013.01); *F16C 33/208* (2013.01); *F16C 17/14* (2013.01); *F16C 2300/14* (2013.01); *F16D 1/068* (2013.01)

(56) References Cited

U.S. PATENT DOCUMENTS

| | | | |
|---|---|---|---|
| 3,971,606 A * | 7/1976 | Nakano et al. | 384/97 |
| 4,809,960 A * | 3/1989 | Kakimoto et al. | 267/141 |
| 5,364,191 A * | 11/1994 | Gruber | 384/203 |
| 5,599,109 A * | 2/1997 | Negwer | 384/308 |
| 6,024,494 A | 2/2000 | Buse | |
| 6,979,129 B2 * | 12/2005 | Farbaniec et al. | 384/297 |
| 2005/0089434 A1 | 4/2005 | Aizawa et al. | |
| 2011/0026864 A1 * | 2/2011 | Than Trong et al. | 384/420 |

FOREIGN PATENT DOCUMENTS

| | | |
|---|---|---|
| DE | 6607928 | 5/1971 |
| DE | 24 27 065 | 7/1975 |
| DE | 76 18 840 | 7/1977 |
| DE | 42 16 559 | 11/1993 |
| DE | 195 26 497 | 6/1996 |
| DE | 100 45 301 | 4/2002 |
| DE | 103 42 786 | 3/2004 |
| DE | 10 2007 052 574 | 5/2009 |
| DE | 10 2008 006 899 | 8/2009 |
| FR | 2 442 371 | 6/1980 |
| GB | 2 202 923 | 10/1988 |
| JP | 01-093615 A | 4/1989 |
| JP | 06-99890 B2 | 12/1994 |
| JP | 07-208461 A | 8/1995 |
| JP | 11-095527 A | 4/1999 |
| JP | 11-212016 A | 8/1999 |
| JP | 2001-124070 | 5/2001 |
| JP | 2002-538392 | 11/2002 |
| JP | 2006-168250 | 6/2006 |
| WO | WO 00/52348 A1 | 9/2000 |

* cited by examiner

PLAIN BEARING HAVING A HARD/SOFT PAIRING

This is a U.S. national phase application, which is based on, and claims priority from, PCT application Serial No. PCT/EP2010/000381, filed Jan. 22, 2010.

The invention relates to a plain bearing having a hard/soft pairing for the sliding surfaces, especially for forming the axial and/or radial bearing of the revolving unit of an underwater power plant.

FIELD OF THE INVENTION

An underwater power plant for utilizing a tidal or water body flow, which power plant is arranged as a submerged free-standing installation, should offer high stability under load especially for installation locations which are difficult to access in order to avoid service measures to the highest possible extent. The bearing of a revolving unit with a water turbine which is typically arranged in the manner of a propeller and a shaft stub represent components which have a relevant influence on the service life of the entire installation.

One possibility to arrange a bearing with the desired stability also for operating conditions for which the introduction of sediments into the bearing cannot be excluded entirely is the use of water-lubricated plain bearings which are known for example as stern tube bearings for ships for example. Such bearings comprise sliding surfaces which show a considerable difference in the material hardness and ductility. For such a soft/hard pairing, a large number of guide shoes with a sliding surface made of a polymer material such as Orkot® can be used for example for forming the first plain bearing shell. The counter-bearing surface of the second plain bearing shell typically consists of a steel part. Such plain bearings show only low wear and tear in the case of a sufficient supply of water as a lubricant even during the introduction of abrasive materials such as sand grains and the like.

The disadvantageous aspect in a generic bearing is the production effort in the case of large overall sizes as are required for underwater power plants with bearing dimensions in the meter range. In particular, the continuous sliding surface needs to be produced precisely with the higher hardness. This especially requires a large amount of effort when several plain bearings are provided for supporting radial and axial loads for underwater power plants for example, which plain bearings need to be adjusted precisely relative to one another.

BACKGROUND

The sliding surfaces of higher hardness of generic plain bearings which are typically arranged in a continuous way usually demand a more complex production process, e.g. by mechanical processing steps such as milling and re-grinding. The production effort will be especially high when such bearing surfaces need to be incorporated in a large-size integral revolving unit of an underwater power plant. Moreover, it is hardly possible to repair sliding surfaces which are provided in such a way after a certain running time of the installation. It is often unavoidable to dismount the entire installation and to re-work the shaft stub of the revolving unit in its entirety or to replace the same.

SUMMARY

The invention is based on the object of constructively arranging a generic plain bearing in such a way that the mounting and adjusting of the same is simplified. Furthermore, a possibility should be provided for repairing individual sliding surfaces in the case of maintenance. In addition, the sliding surfaces should be made of materials which are substantially maintenance-free even under harsh environmental conditions for an underwater power plant, especially at a location in the sea.

The invention is achieved by the features of the independent claim. Advantageous embodiments are provided by the dependent claims.

A generic plain bearing—especially for underwater power plants—is used which comprises a first plain bearing shell with at least one plain bearing segment, and preferably several thereof, and a second plain bearing shell with a running element. The use of a separate running element is proposed for such a plain bearing, which running element forms the sliding surface of higher hardness and which is supported via an intermediate layer by a carrying body.

The separate arrangement of a running element allows the production and the later exchange of individual sliding surfaces of an installation. It is therefore possible for forming radial bearings to use a bearing race instead of milling a sliding surface into a shaft, which bearing race is supported by the shaft as a carrying body. Accordingly, a bearing race can be associated with a thrust collar as the running element for supporting axial forces. Furthermore, the separate arrangement of a running element leads to the advantage that a component of reduced overall size can be handled, so that coating processes are simplified. Furthermore, a material of higher hardness but with a certain amount of brittleness can be used because the carrying body supports the running element on the rear side. This allows arranging the running elements at least partly of a ceramic or glass-like material, or allows using such coatings.

An intermediate layer is provided in accordance with the invention between the running element and the carrying body, which intermediate element has a certain plastic deformability. It is especially preferred to enable adjusting the degree of the plastic deformability in a purposeful way. A material is especially considered for this purpose which is at first ductile in the installed state and can then be converted in a further process step into a material of lower ductility. A specific temperature guidance is predetermined for this purpose in an especially preferred way.

It is possible to produce the intermediate layer from a thermoplastic material or a hot-melt adhesive. A thermoplastic material can be transferred to a temperature range for which there is a sufficient amount of plastic deformability. When hot-melt adhesives are used, a heating over the melting point is accordingly performed during first mounting or adjustment of the running element. The plastic deformability of the intermediate layer decreases with decreasing temperature, so that the bearing temperatures occurring during the operation of the plain bearing ensure secure support of the running element on the carrying body. It is preferable however to maintain a certain residual amount of plastic deformability of the intermediate layer also for normal operation in order to maintain in the bearing a certain amount of readjustment capability within the terms of automatic adjustability in the case of unusually high surface pressing forces.

The invention will be explained below in closer detail by reference to embodiments and the drawings, which show the following in detail:

DETAILED DESCRIPTION

Figure 3:
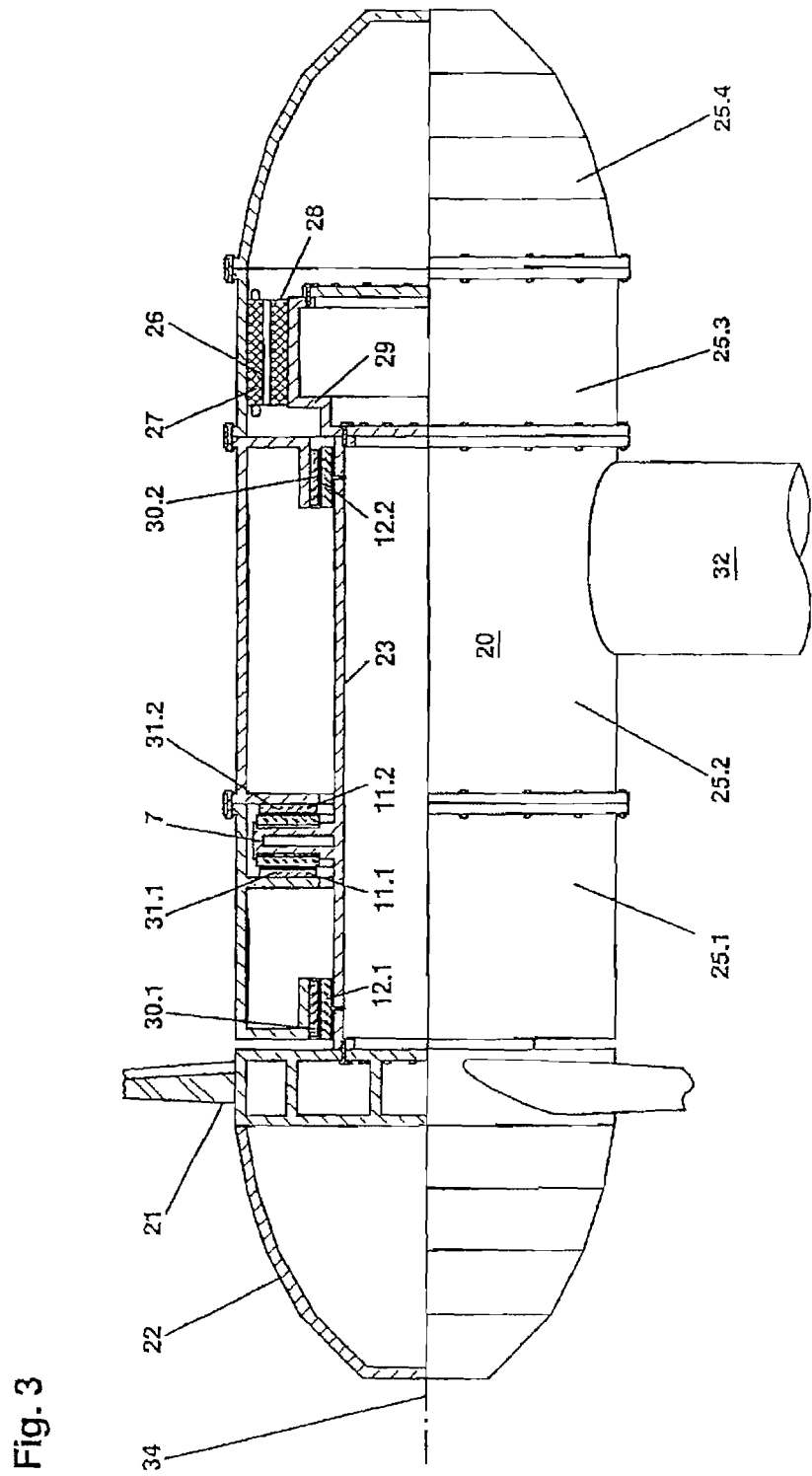
FIG. 3 shows a partial sectional view of an underwater power plant with plain bearings arranged in accordance with the invention.

FIG. 3 shows an underwater power plant 20 which is shown in a schematically simplified and partially sectional view and whose revolving unit comprises a water turbine 21, a hood 22, a shaft stub 23 and a shaft part 29 connected thereto for supporting the rotor 28 of the electric generator 26. Said revolving unit is supported by two radial bearings 30.1, 30.2 in the radial direction and by means of the axial bearings 31.1, 31.2 axially on a thrust collar 7. These bearings are arranged as water-lubricated plain bearings and respectively comprise a running element in accordance with the invention with support via an intermediate layer on a carrying body. This will be explained below in closer detail. Each of the plain bearings comprises a first plain bearing shell which is arranged in a segmented fashion, with the plain bearing segments used here comprising a sliding surface made of a polymer material. The plain bearing segments are further adjustably fixed to a first segment 25.1 and a second segment 25.2 of the static housing part of the underwater power plant 20.

Figure 1:
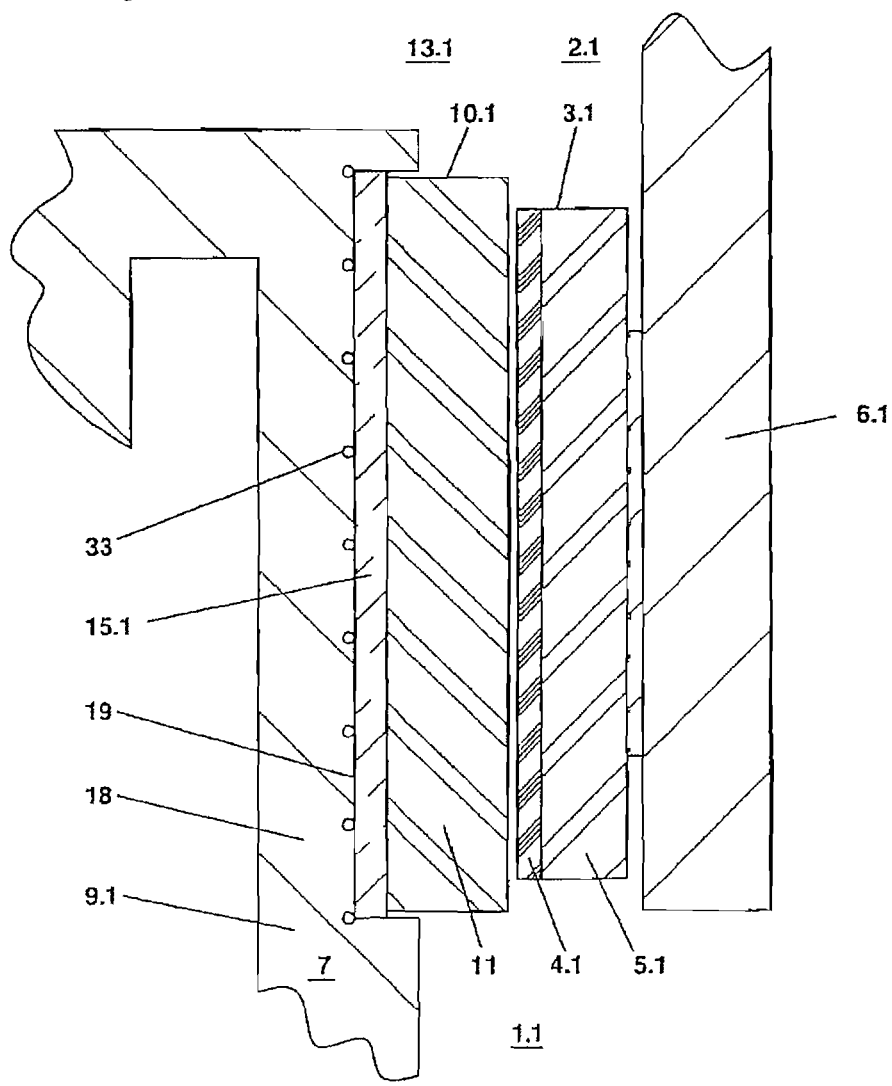
FIG. 1 shows a part of a sectional view of a plain bearing in accordance with the invention for the support of axial forces on a thrust collar.

FIG. 1 shows an enlarged section of the axial bearing 31.2 in a sectional view. The first plain bearing shell 2.1 comprises a plurality of plain bearing segments 3.1, of which one is shown in a cross-sectional view. The sliding surface of the plain bearing segments 4.1 consists in the present case of a seawater-proof plain bearing material on the basis of polymer. The sliding surface of the plain bearing segment 4.1 is carried by a base 5.1 and preferably comprises an apparatus (not shown in closer detail) for setting the position and for fixing to the housing part 6.1. It is additionally possible to mount the plane bearing segments 3.1 with a certain amount of movement capability on the housing part 6.1.

The second plain bearing shell 13.1 is arranged as a part of a thrust collar 7 for the present plain bearing 1.1. Accordingly, the carrying body 9.1 is a thrust collar support 18 into which the groove 19 has been turned. An intermediate layer 15.1 is disposed on the base of the groove 19, on which the running element 10.1 is arranged in form of a turbine disk 11. Preferably, such a material thickness is chosen for the intermediate layer 15.1 that the turbine disk 11 will protrude partly into the groove 19, so that an improved lateral guidance of turbine disk 11 is produced on the one hand and only a low gap width remains on the other hand between the edge of the turbine disk 11 and the adjacent wall of groove 19, which gap width is chosen in such a way that the intermediate layer 15.1 in the groove 19 can also be substantially held in the groove even in the state of high plastic deformability.

For a first preferred embodiment, the intermediate layer 15.1 consists of a thermoplastic material. The thermoplastic material can preferably chosen from the group which is formed by polymethyl methacrylate (PMMA), polyamide (PA), polycarbonate (PC), polyethylene enterephthalate (PET), polyethylene (PE), polypropylene (PP), polystyrene (PS), polyvinyl chloride and acrylonitrile butadiene styrene (ABS). The plastomer will be transferred to a state of sufficiently large plastic deformability by heating, which can be caused for example by the electrical heating device 33 as outlined in FIG. 1. In this state, which is used during first-time mounting for adjustment purposes or the renewed setup of the running element 10.1 in the case of maintenance, the position of the running element 10.1 is aligned by means of a measuring and guide device (not shown in detail in the drawings) in relationship to the running surfaces of the further axial bearing 31.1 and the radial bearings 30.1, 30.2. When the shaft stub 23 of the revolving unit is precisely clamped and made to rotate, a self-centering of the running element of the plain bearing can be achieved by means of precisely setup limit stops.

Figure 2:
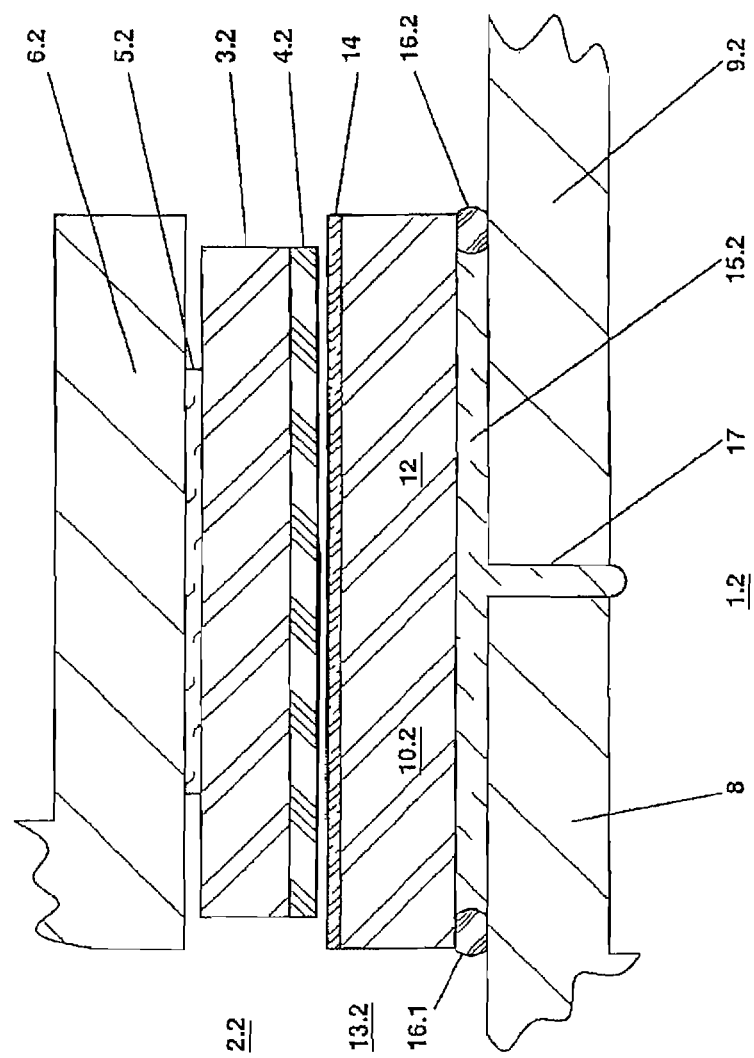
FIG. 2 shows a sectional view of a section of a plain bearing in accordance with the invention for radial support.

FIG. 2 shows an alternative configuration of the embodiment on the basis of an enlarged sectional view of the radial bearing 30.1. The generic plain bearing 1.2 again comprises a first bearing shell 2.2, for which a plain bearing segment 3.2 is illustrated with a base 5.2 and a sliding surface of the plain bearing segment 4.2 which is fixed to a housing part 6.2.

The second plain bearing shell 13.2 of the plain bearing 1.2 in accordance with the invention comprises a separate running element 10.2 in form of a bearing race 12. The inside diameter of the bearing race 12 is provided with an interference in relation to the outside diameter of the shaft 8, which represents the carrying body 9.2 for the present embodiment. Accordingly, the bearing race 12 can be guided for mounting over the shaft 9. The intermediate space thus formed between the bearing race 12 and the shaft 8 is filled by the intermediate layer 15.2. For this purpose, the bearing components are brought to temperature and a hot-melt adhesive which is free-flowing in the hot state will be filled into the intermediate space through the lead-through opening 17 in the shaft 8. Polyamide, polyethylene, amorphous polyalphaolefin, ethylene vinyl acetate, polyester elastomers, polyurethane elastomers, copolyamide elastomers or a mixture of said polymers will be used as basic polymer for the hot-melt adhesive.

Preferably, elastic sealing elements 16.1, 16.2 are provided in annular gap openings of the intermediate space between the bearing race 12 and the shaft in order to prevent any escape of the hot-melt adhesive. After the application of the hot-melt adhesive, the adjustment of the bearing race 12 relative to the shaft 8 is performed. As a result of this measure, eccentricities and centering imprecision will be compensated by this measure to such an extent that separate reworking of the bearing race will no longer be necessary. The cooling of the plain bearing 1.2 for hardening the hot-melt adhesive occurs next.

FIG. 2 shows an embodiment for which the running element 10.2 carries a hard layer 14. It can be a glass-like material or a ceramic material which is preferably applied by means of the coating process onto the bearing race 12. It is possible for such an embodiment to produce the bearing race from a softer material than the sliding surface. The use of a non-metallic material can be considered. It is also possible to produce it by casting by means of an epoxy resin, e.g. by means of Epocast®. Furthermore, there is a possibility to provide the running element 10.1, 10.2 in such a way that it has a certain amount of elasticity for conformability. The desired precise contour of the sliding surface will be set up in the method step of adjustment only when the underlying intermediate layer 15.1, 15.2 is sufficiently deformable in a ductile manner. With decreasing plastic deformability, the contour of the sliding surface thus set up will be stabilized, so that there will be a sufficiently loadable and precise sliding surface in operation of the plain bearing. The sliding surface is preferably re-adjustable and allows reducing the tumbling eccentricities by revolving components that are imprecisely set with respect to each other in such a way that the intermediate layer will maintain a minimum amount of plastic deformability and the running element will therefore continually maintain a minimum distance from the narrowest point of the opposite sliding surface.

The invention can be varied by a person skilled in the art within the scope of the following claims. It is possible that a plain bearing in accordance with the invention comprises several running elements 10.1, 10.2 which may be combined under certain circumstances to form a sliding surface and which according to an integral running element are in connection via an intermediate layer 15.1, 15.2 with adjustable plastic deformability with the carrying body 9.1, 9.2 and can be adjusted relative to one another.

Figure 4:
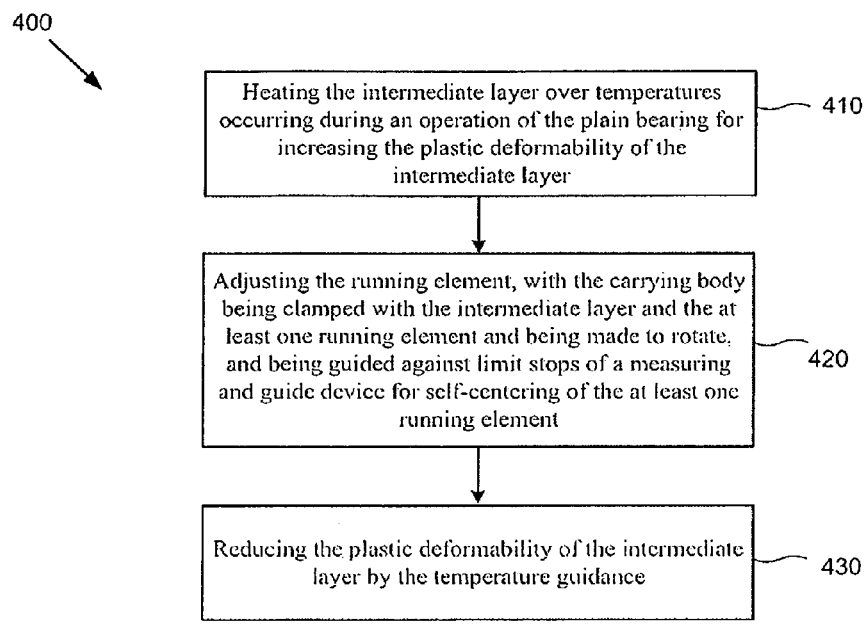
FIG. 4 shows an exemplary method for producing a plain bearing.

FIG. 4 shows method 400 for producing a plain bearing, as set forth in 410, 420 and 430.

LIST OF REFERENCE NUMERALS 1.1, 1.2 Plain bearing
2.1, 2.2 First plain bearing shell
3.1, 3.2 Plain bearing segment
4.1, 4.2 Sliding surface of the plain bearing segment
5.1, 5.2 Base
6.1, 6.2 Housing part
7 Thrust collar
8 Shaft
9.1, 9.2 Carrying body
10.1, 10.2 Running element
11, 11.1, 11.2 Turbine disk
12, 12.1, 12.2 Bearing race
13.1, 13.2 Second plain bearing shell
14 Hard layer
15.1, 15.2 Intermediate layer
16.1, 16.2 Sealing element
17 Lead-through opening
18 Thrust collar carrier
19 Groove
20 Underwater power plant
21 Water turbine
22 Hood
23 Shaft stub
24 Machine nacelle
25.1 First segment
25.2 Second segment
25.3 Third segment
25.4 Fourth segment
26 Electric generator
27 Stator
28 Rotor
29 Shaft part
30.1, 30.2 Radial bearing
31.1, 31.2 Axial bearing
32 Support structure
33 Electrical heating device
34 Rotational axis

The invention claimed is:

1. A method for producing a plain bearing comprising at least one plain bearing segment for forming a first plain bearing shell, at least one running element of a second plain bearing shell which forms a counter-bearing surface to the at least one plain bearing segment, with a sliding surface of the at least one running element having a higher hardness than a sliding surface of the at least one plain bearing segment, a carrying body for the at least one running element, an intermediate layer which is arranged between the at least one running element and the carrying body, a plastic deformability of which can be set by a temperature guidance, the method comprising:

heating the intermediate layer over temperatures occurring during an operation of the plain bearing for increasing the plastic deformability of the intermediate layer;

adjusting the running element, with the carrying body being clamped with the intermediate layer and the at least one running element and being made to rotate, and being guided against limit stops of a measuring and guide device for self-centering of the at least one running element; and reducing the plastic deformability of the intermediate layer by the temperature guidance.

2. The method according to claim 1, wherein the intermediate layer comprises a thermoplastic material or a hot-melt adhesive.

3. The method according to claim 2, wherein the thermoplastic material is chosen from the group which is formed by polymethyl methacrylate (PMMA), polyamide (PA), polycarbonate (PC), polyethylene enterephthalate (PED, polyethylene (PE), polypropylene (PP), polystyrene (PS), polyvinyl chloride and acrylonitrile butadiene styrene (ABS).

4. The method according to claim 3, wherein a groove is provided in the carrying body, in which the intermediate layer and a part of the at least one running element are accommodated.

5. The method according to claim 4, wherein at least one scaling element is provided which counteracts an escape of the intermediate layer from a gap between the at least one running element and the carrying body.

6. The method according to claim 3, wherein at least one sealing element is provided which counteracts an escape of the intermediate layer from a gap between the at least one running element and the carrying body.

7. The method according to claim 2, wherein basic polymer of the hot-melt adhesive is chosen from the group which is formed by polyamide, polyethylene, amorphous polyalphaolelins, ethylene vinyl acetate, polyester elastomers, polyurethane elastomers, copolyamide elastomers.

8. The method according to claim 7, wherein a groove is provided in the carrying body, in which the intermediate layer and a part of the at least one running element are accommodated.

9. The method according to claim 8, wherein at least one scaling element is provided which counteracts an escape of the intermediate layer from a gap between the at least one running element and the carrying body.

10. The method according to claim 7, wherein at least one sealing element is provided which counteracts an escape of the intermediate layer from a gap between the at least one running element and the carrying body.

11. The method according to claim 2, wherein a groove is provided in the carrying body, in which the intermediate layer and a part of the at least one running element are accommodated.

12. The method according to claim 11, wherein at least one sealing element is provided which counteracts an escape of the intermediate layer from a gap between the at least one running element and the carrying body.

13. The method according to claim 2, wherein at least one sealing element is provided which counteracts an escape of the intermediate layer from a gap between the at least one running element and the carrying body.

14. The method according to claim 1, wherein a groove is provided in the carrying body, in which the intermediate layer and a part of the at least one running element are accommodated.

15. The method according to claim 14, wherein at least one sealing element is provided which counteracts an escape of the intermediate layer from a gap between the at least one running element and the carrying body.

16. The method according to claim 1, wherein at least one scaling element is provided which counteracts an escape of the intermediate layer from a gap between the at least one running element and the carrying body.

17. The method according to claim 1, wherein the carrying body is part of a thrust collar carrier and the at least one running element is a turbine disk associated with a thrust collar.

18. The method according to claim 1, wherein the at least one running element consists of a metallic material, ceramics or glass, or carries a layer made of the metallic material, ceramics or glass.

19. The method according to claim 1, wherein the at least one running element comprises on the sliding surface a coating made of a hard material including a metallic nitride or a ceramic material.

20. The method according to claim 1, wherein the plain bearing segment comprises a sliding surface made of a polymer material.

* * * * *